United States Patent [19]

Tarlton et al.

[11] Patent Number: 4,627,529

[45] Date of Patent: Dec. 9, 1986

[54] SPIRAL CONVEYOR

[75] Inventors: Curtis S. Tarlton, Florham Park; Richard A. Ford, Blackwood, both of N.J.

[73] Assignee: C. & T. Tarlton, Inc., Union, N.J.

[21] Appl. No.: 725,387

[22] Filed: Apr. 22, 1985

[51] Int. Cl.$^4$ .................... B65G 21/18; B65G 21/20
[52] U.S. Cl. ................................ 198/778; 198/500; 198/840
[58] Field of Search ............ 198/778, 500, 841, 328, 198/840

[56] References Cited

U.S. PATENT DOCUMENTS

| 701,459 | 6/1902 | Aston | 198/328 |
|---|---|---|---|
| 991,433 | 5/1911 | Edison | 198/500 |
| 2,066,206 | 12/1936 | Laurie | 198/500 |
| 2,304,571 | 12/1942 | Joa | 198/500 |
| 2,866,538 | 12/1958 | Goldberg | 198/841 |
| 3,666,083 | 5/1972 | Smith | 198/778 |
| 3,744,618 | 7/1973 | Monne et al. | 198/500 |
| 3,826,352 | 7/1974 | Van Zon et al. | 198/778 |
| 3,904,025 | 9/1975 | Garvey | 198/778 |
| 4,269,302 | 5/1981 | Garvey | 198/778 |

Primary Examiner—Joseph E. Valenza
Assistant Examiner—Daniel R. Alexander

[57] ABSTRACT

An improved spiral conveyor comprising a rigid integral central tubular core member which is arranged vertically dependent upon the desired height of the conveyor system. A continuous conveyor chain is moved over a pair of continuous spaced tracks which are mounted in a generally spiral path about the central member. The tracks are constructed and arranged to include flat surfaces disposed for minimizing frictional contact with the conveyor chain whereby the capstan affect is reduced. The chain is driven at its infeed and outfeed ends by an electric motor disposed at one of these locations and is reversible depending upon the desired direction of flow. The chain returns upon itself. The infeed and outfeed ends of the conveyor chain are arranged in tangential relationship with respect to the adjoining portion thereof to facilitate side transfer, if desired, of the conveyed product. The tracks are provided with a continuous channel for further reducing frictional contact with the adjacent overlying conveyor chain as well as providing a lubrication reservoir for receipt of grease dispersed from grease injectors disposed along the path.

13 Claims, 14 Drawing Figures

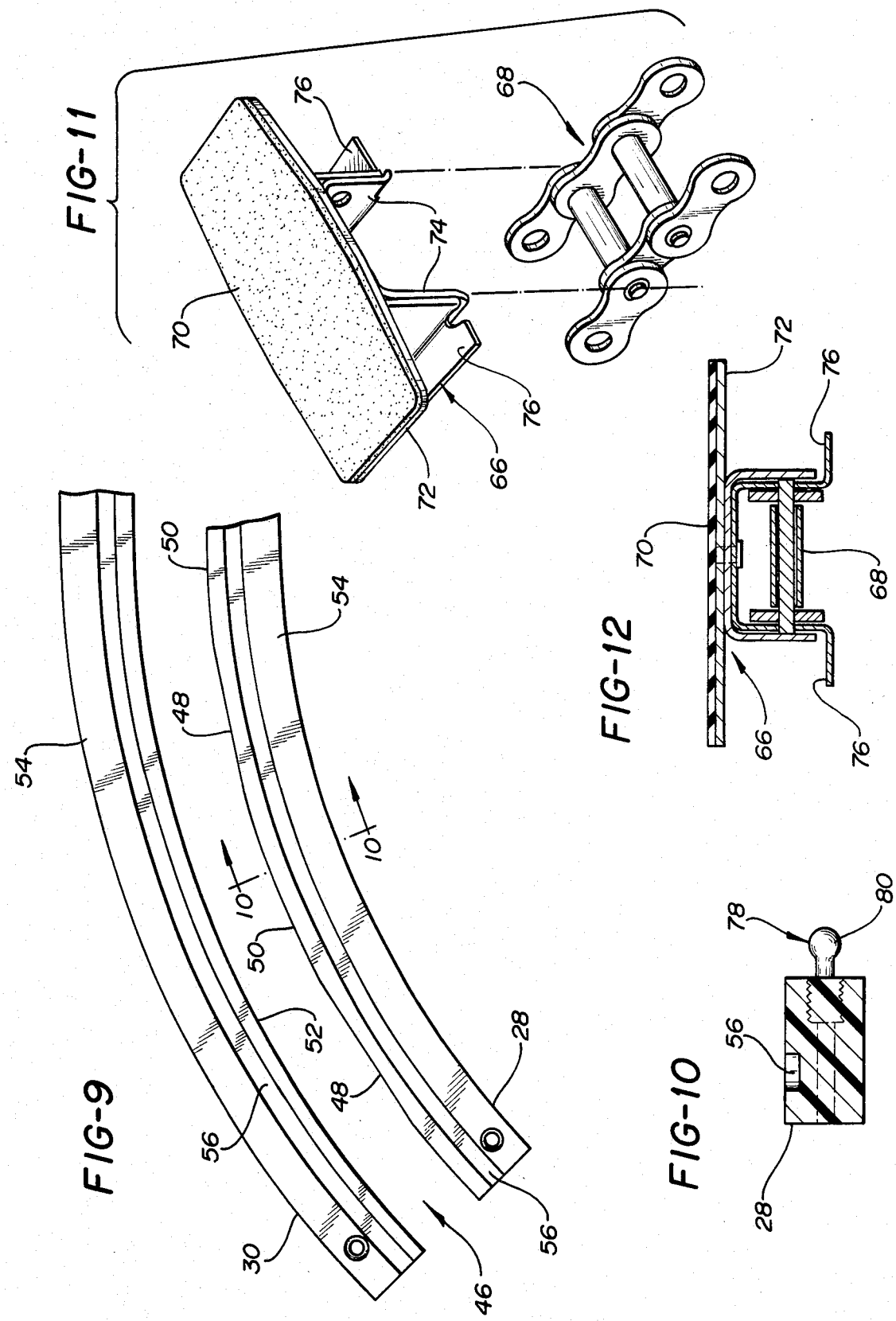

SPIRAL CONVEYOR

FIELD OF THE INVENTION

The present invention relates to an endless conveyor and in particular to such a conveyor disposed in a vertical inclining/declining spiral configuration, having a structurally integral central tubular core surrounded by a continuous conveyor track designed to reduce frictional contact with respect to the conveyor.

DESCRIPTION OF THE PRIOR ART

In general vertical conveyors which are arranged to provide spiral conveying paths are generally known in the prior art. Typical of such devices is the conveyor illustrated in U.S. Pat. No. 3,904,025 which illustrates a spiral conveyor comprised of a series of modular frames, wherein the return path for the conveyor is separate and distinct from the conveying path. Another prior art device is illustrated in U.S. Pat. No. 4,269,302 which illustrates a non-continuous conveyor surface for a spiral conveyor, which is adapted to be constructed of a plurality of stacked modular frames to accommodate varying heights of the conveyor. Further prior art device is shown in the Dodge U.S. Pat. No. 782,009 which illustrates a general spiral path surrounding a central framelike support construction.

All of these prior art devices, however, suffer from various deficiencies which are not found in the present invention. For example, they do not provide a structurally rigid conveyor which can be arranged at a desired conveyor height in combination with a conveyor track construction and arrangement that minimizes frictional contact with respect to the conveyor chain carried by the track. The present invention also is designed for relatively easy transfers from the unit to another unit, while at the same time permitting a relatively high operating speeds and reduced capstan affect.

SUMMARY OF THE INVENTION

The present invention essentially comprises a spiral conveyor comprising a rigid central tubular core which consists of a plurality of interconnected stacked cylindrical members designed to provide the desired vertical conveyor height. About the core is mounted a track which supports a continuous product conveyor chain. The track is comprised of inner and outer tracks with the vertically disposed inner surface of the inner one of the tracks comprising a multi-sided polygon construction including a plurality of relatively flat surfaces along its length disposed for reducing frictional contact with the adjoining conveyor chain, so as to reduce the amount of energy required for driving the conveyor. The conveyor may be arranged at its infeed and outfeed ends in tangential relationship with respect to the adjoining portion of the conveying path to facilitate side transfers with other conveying units. The conveyor returns upon itself and is driven at one end by a primary drive which is interconnected with a secondary drive located at the other end of the conveying path. Means are provided for reversing the direction of the conveying path when desired.

An object of the present invention is to construct an improved spiral conveyor in a relatively simple economical and energy efficient manner.

Another object of the invention is to provides a spiral conveyor which permits variation in the height of the overall assembly while maintaining structural integrity of the conveyor.

A further object of the invention is to provide a conveyor that includes a conveyor track construction which assist in the reduction of energy required for driving the conveyor.

Still yet a further object of the invention is to permit relatively high operating speeds for the conveyor.

An object of the invention is to provide an inclining/declining spiral product conveyor with a continuous endless conveyor surface extending between the infeed and outfeed ends of the conveyor.

These and other objects and advantages of the present invention will become apparent from the following description of the preferred embodiment of the present invention when considered in conjunction with the accompanying drawings.

BRIEF DESCRIPTION OF THE DRAWINGS

FIG. 9 illustrates an enlarged plan view of a portion of the spiral track which supports the conveyor chain of the present invention;

FIG. 10 is an enlarged cross-section taken substantially along the line 10—10 of FIG. 9 illustrating the track with the addition of a grease fitting according to the present invention;

FIG. 11 is an exploded perspective view of the chain and the flight attachment including the product conveying surface according to the present invention;

FIG. 12 is a cross-section of the component parts of FIG. 11 assembled.

DESCRIPTION OF A PREFERRED EMBODIMENT

Figure 1:
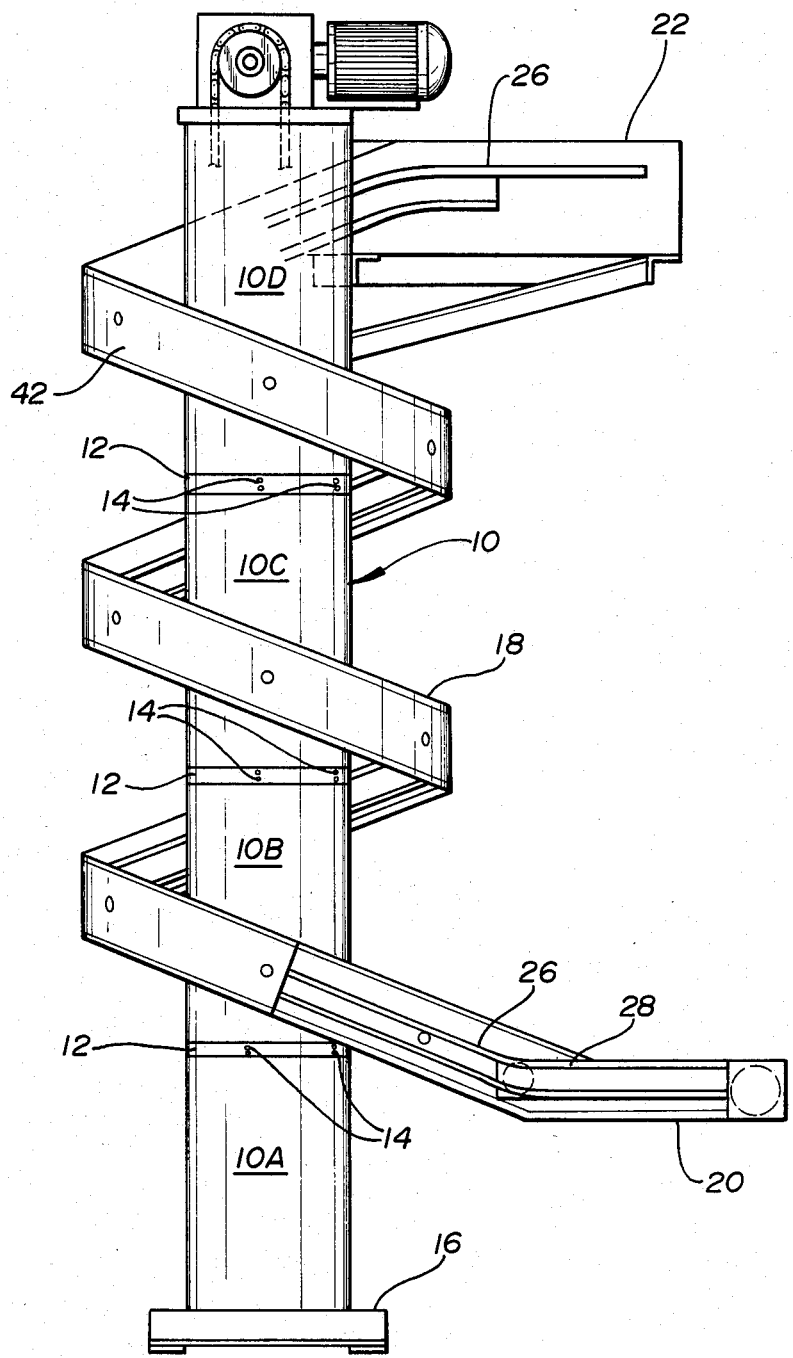
FIG. 1 is an elevation view of a spiral conveyor constructed and arranged according to the present invention with certain portions thereof removed.
Figure 2:
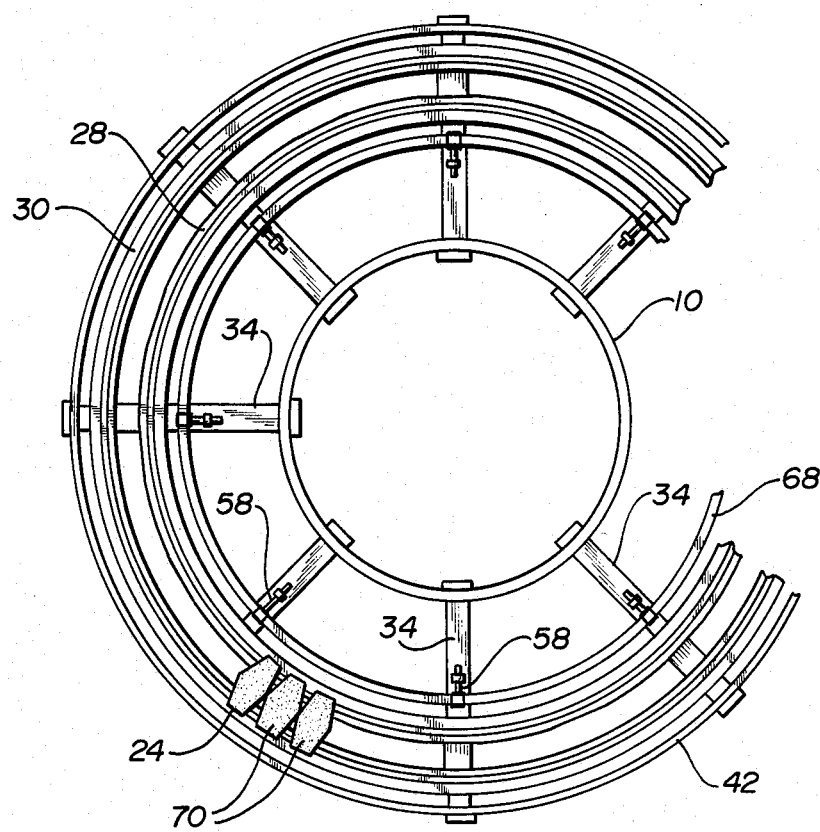
FIG. 2 is a cross-sectional view taken along lines 2—2 in FIG. 1 with the motor infeed and outfeed transfer portion being removed.
Figure 3:
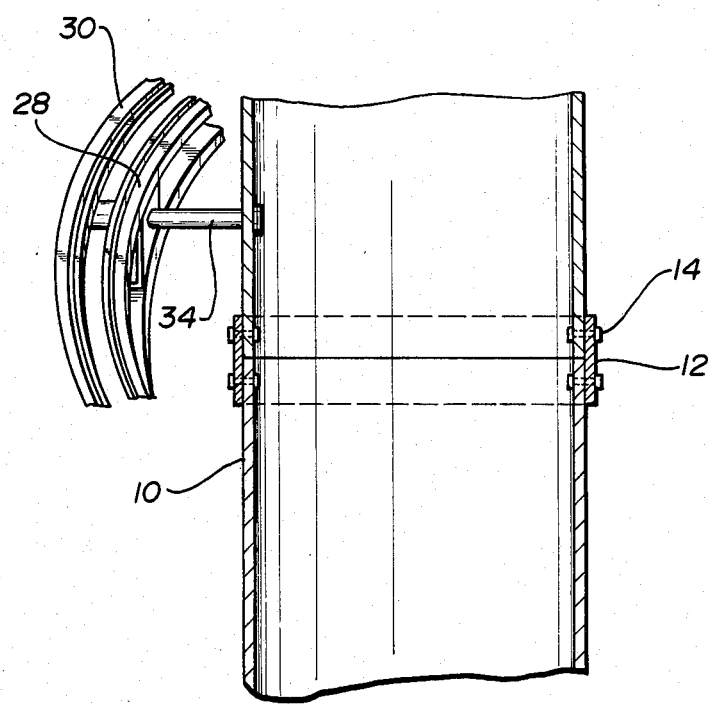
FIG. 3 is an enlarged partial cross-sectional view taken along the lines 3—3 in FIG. 2.
Figure 5:
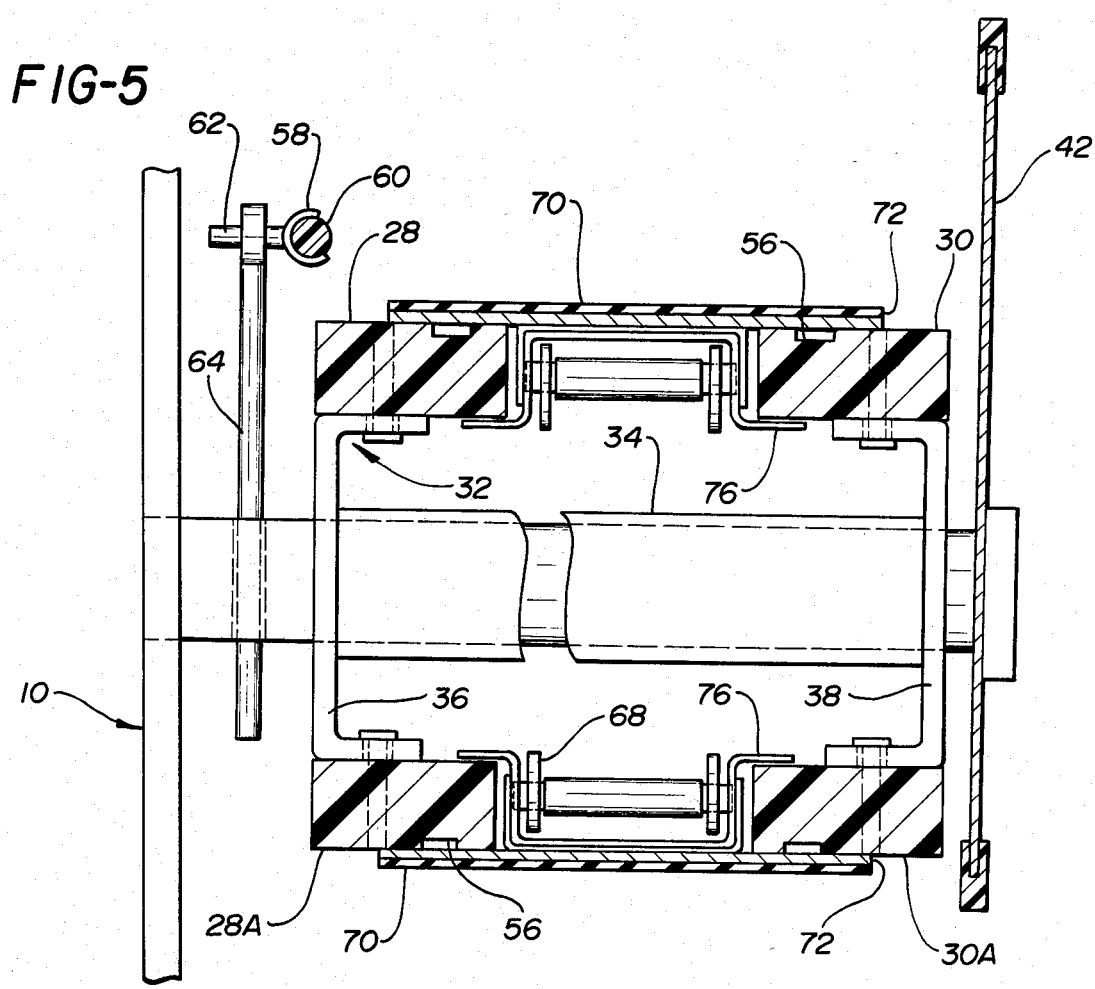
FIG. 5 is an enlarged cross-sectional view of the track and conveyor chain assembly mounted with the conveyor as shown in FIGS. 1 and 2.

As illustrated in FIGS. 1–4 in particular, the present invention is embodied in an inclining (or declining if desired) product spiral vertical conveyor constructed on a structurally rigid central tubular core member 10 comprising a plurality of vertically stacked cylindrical members 10A, 10B, 10C and 10D, etc. These members are secured to each other by means of an annular band 12 which is bolted at spaced locations about its periphery by bolts 14 secured between the band and adjoining ones of the cylindrical members as best illustrated in FIG. 3. The band overlaps adjacent members. The lowermost one of the members, in this case shown is 10A, is mounted directly on the base 16 which may in turn be secured to the floor on which the conveyor is located. This solid cylindrical arrangement provides a compact unit with substantial structural integrity, as well as nice appearance, for supporting the spiral conveyor, while at the same time maintaining some semblance of modularity by means of the stacked cylindrical members which enable variation in the height of the conveyor to accommodate the needs of the particular system. The conveyor has mounted about the central tubular core a product conveying conveyor path generally illustrated at 18 which extends continuously between an infeed end 20, which may be at the tail of the unit (here shown at the bottom), and an outfeed or discharge end 22 which may be at the head of the conveying path (here shown at the top). The conveyor path is comprised of a conveyor chain 24 which forms a continuous conveyor surface 26 arranged in a spiral vertical path about the core. The conveying path is supported and defined by a chain track which comprises a pair of transversely or laterally spaced upper tracks 28 and 30 and lower tracks 28A and 30A supported on a bracket 32. The bracket (see FIGS. 5 and 6) is a unitary member comprising a central tubular member 34 secured, e.g. welding, at opposite ends to opposed U-shaped flanged members 36, 38 with the flanges facing each other so as to provide support for the conveyor. Elongated slots 40 are provided in each flange. A support rod 42 extends through member 34 and is secured conventionally (e.g. welding) at one end to the core 10 and at its other end has an enlarged head which firmly supports the outer guide 42 which extends about the spiral conveying path. Guide 42 provides an outer restraint for guiding the conveyed products. The bracket supports the tracks and maintains them in spaced parallel relations as best illustrated in FIG. 5. Bolts 44 extend through the slots 40 for securing the tracks to the bracket 32. A plurality of similar brackets are mounted along the entire conveying path to provide the desired support for the conveyor tracks.

Figure 7:
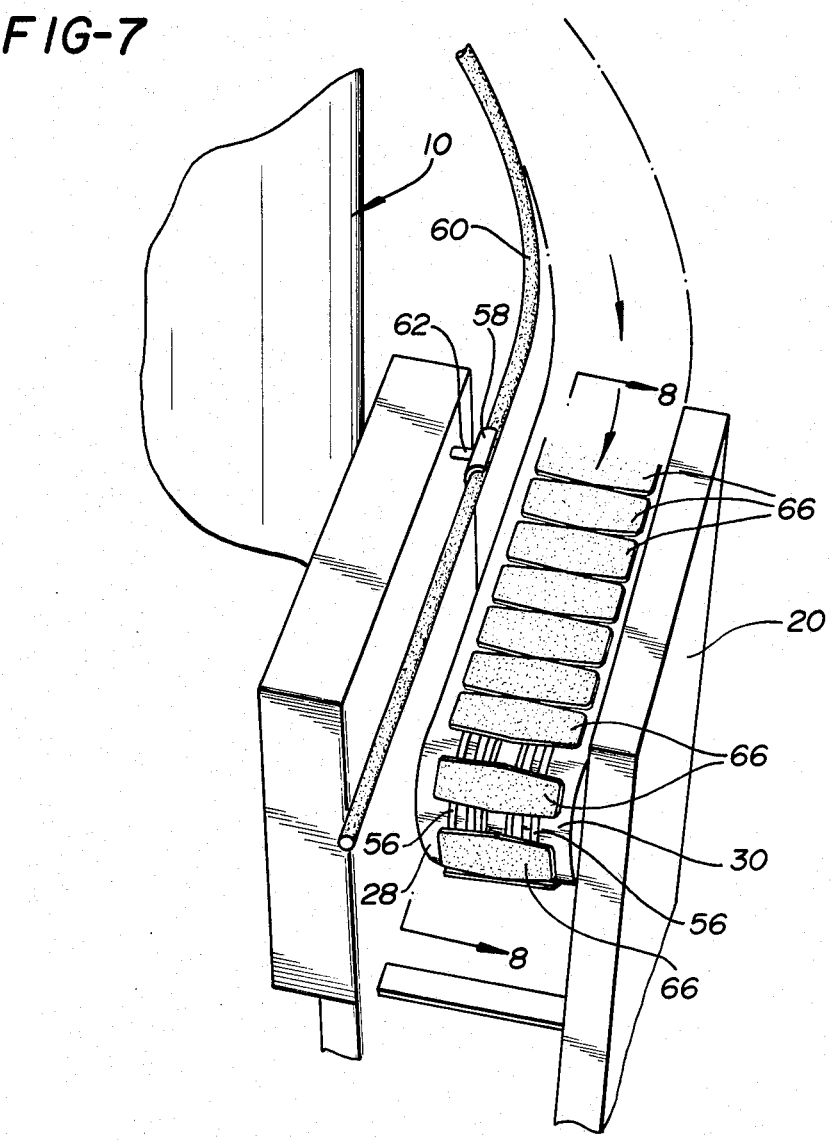
FIG. 7 is a perspective view of tangentially arranged infeed end portion of the conveyor of FIG. 1.
Figure 8:
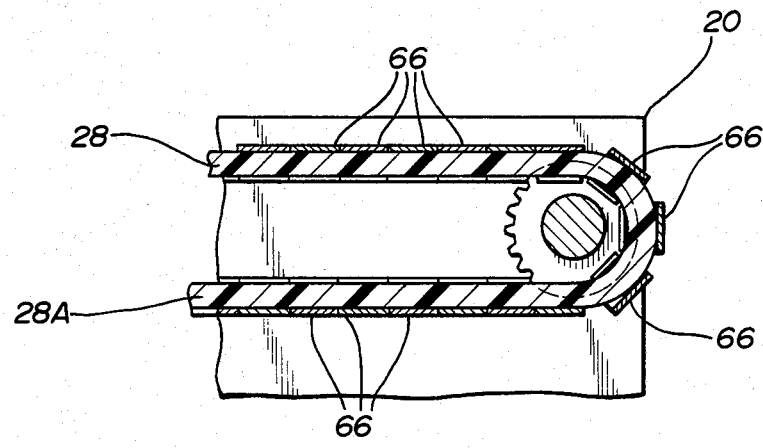
FIG. 8 is a cross-sectional view taken substantially along the line 8—8 of FIG. 7 illustrating the construction and arrangement of the track relative to the conveyor chain at an end thereof.

The tracks are defined via conveying path and are comprised of a plurality of contiguous portions of predetermined length, which are secured in end-to-end relation to essentially define a continuous conveying path and return path which returns upon itself (as best illustrated in FIGS. 7 and 8). The tracks preferably are made of ultra high molecular weight polyethelene although they can be made from other materials such as Nolu S & Bronze as well. While the overall configuration of the track is perceived as a true spiral it is designed according to the present invention such that the inner surface 46 of the inner track 28 comprises a multi-sided polygon arrangement, that is, it is comprised of a plurality of flat surfaces 48 and curved surfaces 50 extending in the direction of the vertical axis of the core 10 to facilitate reduction of friction with respect to the adjoining conveyor chain. It is important to maximize the flat surfaces in order to reduce frictional contact with the conveyor chain to the maximum extent. A typical track length covers a 90° arc at a 19 inch minimum radius and a polygonal track construction is provided with respect to each 360° path about the central core. This minimizes the contact between the chain and the track and provides for a highly energy efficient system which requires less horsepower than in other prior art systems. It also aids in breaking the well known "capstan" effect. The inner surface 52 of the outer one 30 of the tracks comprises the usual curvilinear shape since the conveyor chain tends to contact the opposed track surface 46 due to the aforedescribed capstan effect. Each track segment is provided in its upper and bottom contact surfaces 54 with respect to the conveying conveyor chain, with an elongated groove or channel 56 which extends for the length of each track segment. This groove will also aid in the reduction of contact with respect to the conveyor chain as later described.

Figure 6:
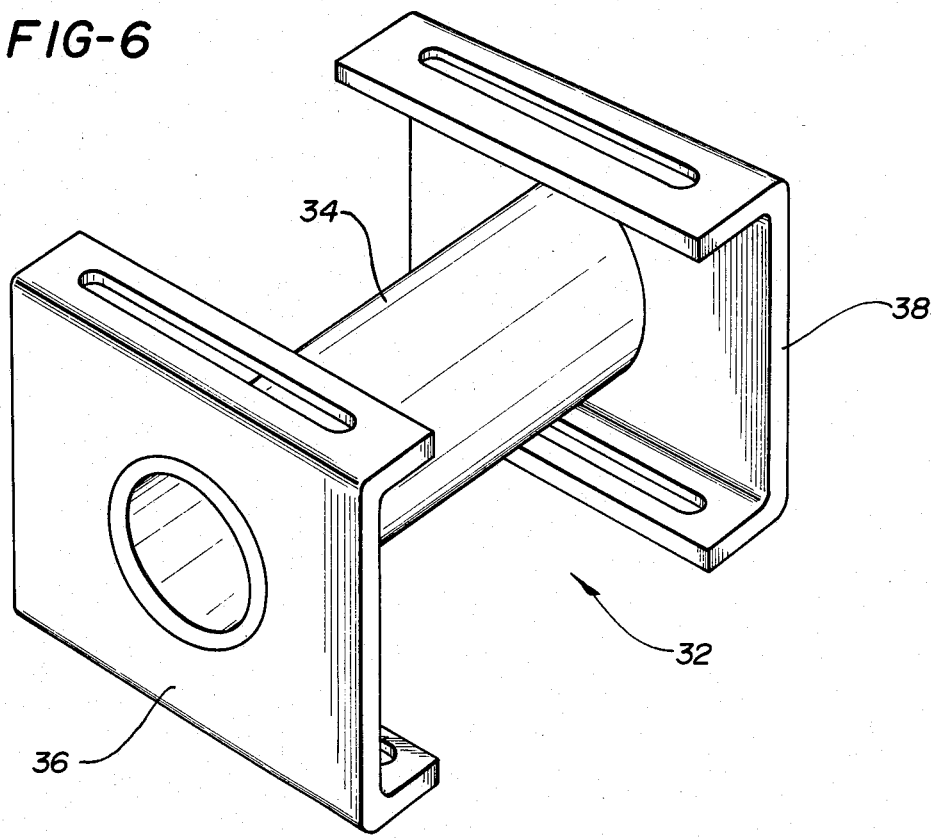
FIG. 6 is an enlarged view of the bracket for supporting the conveyor chain of the conveyor shown in FIG. 5.

The conveying path and return path of the track are maintained in the desired spaced relation as best illustrated in FIG. 6 by means of the bracket 32. An adjustable inner guide rail 58 (see FIGS. 5 and 7) also is provided and mounted by the track supporting bracket 32 as well. The rail comprises a continuous solid member 60 having a circular cross-section which is spaced from the central core at the desired distance such that the inner guide rail defines with the outer guide 42 the defined path of travel for the conveyed product along the conveying path. The inner adjustable guide rail is supported by a member having an openended U shaped or circular support member at its inner end and is adapted for being moved with respect to the central core to modify the width of the conveying path. The railing is supported by an arm 64 which is carried by the bracket support rod.

Figure 4:
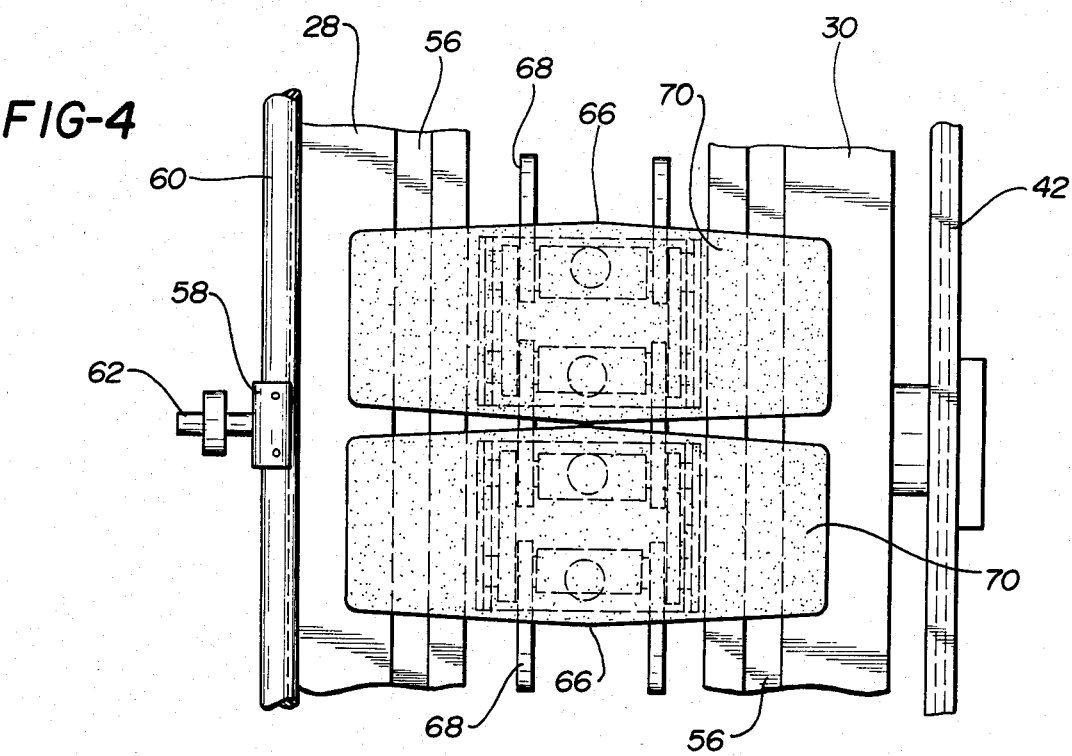
FIG. 4 is a plan view of a portion of the spiral track segment containing the conveyor chain mounted thereon.

The conveyor is comprised of a plurality of contiguously arranged flight attachments 66 which are mounted on a conventional conveyor chain 68 which extends continuously about the conveying path. Each flight attachment comprises a rubber clad steel chain comprising an upper or exposed rubber product supporting surface 70 clad on a lower steel plate 72 which in turn has flanged bracket portions 74 extending downwardly therefrom such that the lower flanges 76 are disposed on the bottom side of the adjacent chain track 68 and the upper or supporting steel plate is disposed along the opposite chain track surface containing the aforementioned track groove 56. The flight attachment is disposed such that the track is captured by the flanged bracket and plate 72. each flight attachment is secured in a conventional manner with the chain as best shown in FIGS. 4, 5 and 12, such that as the chain is driven about the conveying and return path the flanged bracket maintains the conveyor in its desired continuous conveying path. The normal tendency for the conveyor at the infeed and outfeed ends thereof where it enters from one directional path to the opposite direction, that is, from the conveying or return into the other path in the opposite direction, is such that it tends to fly or proceed in the tangential direction with respect to the direction in which it was traveling. However, since the flight attachment bracket captures the track, this retains the conveyor in the desired conveying path along its entire path including at the ends thereof. By capturing the chain, the conveyor is permitted to operate at relatively high operating speeds. It is also possible to intermix the flight attachments with plastic and rubber faced steel chain flights, instead of all one kind because of the capability of controlling the chain as described above.

Another feature according to the present invention is that the infeed and outfeed ends 20, 22 of the conveying path can be arranged in tangential relationship, i.e. 90 degree infeed and outfeed, with respect to the adjoining path. Thus, by arranging these end portions (e.g. see FIGS. 1 and 7) in a relative tangential relationship, that is, substantially perpendicular with respect to a plane passing through the longitudinal axis of the tubular core 10. The present conveyor can utilize these straight sections to facilitate side transfer onto or from other conveying systems, which would not be possible if these portions were other than substantially straight as disclosed herein.

It should also be pointed out that by providing the conveyor with a rubber clad steel chain the relative elevation angle of the conveyor can be increased to approximately 15 to 17 degrees while still maintaining a good safety margin for most products. This is because of the frictional nature of the rubber which will make frictional contact with the products and maintain it in the desired conveying position, and thus prevent toppling.

The present invention also includes a multiplicity of grease fittings 78 disposed along the spiral conveying path. This is illustrated particularly in FIG. 10 wherein there is shown a grease fitting which extends into the track 30 and has an enlarged head portion 80 extending outwardly therefrom. Thus, periodically in order to lubricate the conveyor a grease gun engages the head and causes grease to enter the head and pass through the fitting and enter into contact with the conveyor chain. The channel 56 formed in the track also may receive a certain amount of the grease by the grease contacting the top plate of the chain and wiping off in the groove. Thus, the channel provides a reservoir for the grease to facilitate movement of the conveyor over the track.

Figure 13:
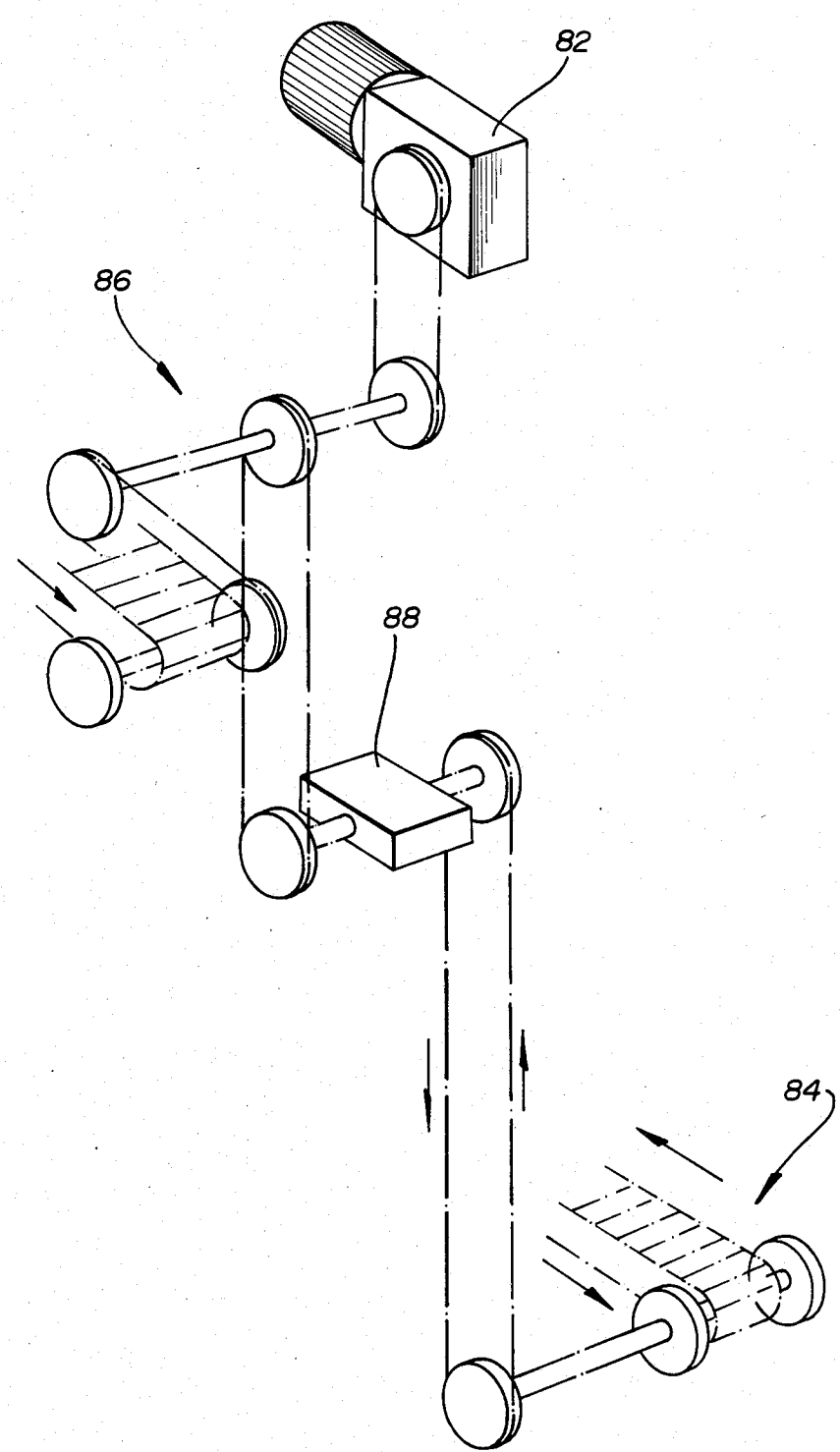
FIG. 13 is a schematic illustration of the driving arrangement according to the present invention.

The drive for the conveyor includes a primary drive which is either an AC or DC motor 82 depending upon the particular conveyor system. The primary drive operably drives a secondary drive 84 (as a slave system) located at the opposite end of the conveying path through a plurality of gears, chains and pulleys as schematically illustrated in FIG. 13 in order to create a push-pull driving action of the conveyor chain. The secondary drive is similar to the primary drive in construction and strength. Thus, the motor is pulling the chain at its primary drive end and through the driving system the chain is being pushed at the opposite end thereof, all from a single motor. Of course, it is within the contemplation of the present invention if required to provide additional motors intermediate of the ends of the conveying path. Typically, when more than 1800° of wrap is designed into a spiral an additional module drive motor may be used. As shown the motor 82 drive the head or discharge in a first direction through a standard chain-gear pulley arrangement 86. This in turn is operably engages a plurality of miter gears 88 which can enable reversing the direction of the conveying path if desired. The operation and arrangement of this drive is conventional. By providing a push pull drive of the chain this will overcome the capstan affect present in any curvilinear drive and also reduces the chains sprocket tension which will occur.

Assuming that the motor gears and sprockets are rotating in the direction as shown in FIG. 12, the conveyor chain will be moving in an upwardly vertical spiral from the tail or infeed end to the discharge or head end. The goods to be moved along the conveyor would be deposited on the conveyor at the in feed end and the goods for example, cartons, boxes, and other individual items with stability in motion, will be moved through the vertical distance between the base and the top of the conveyor. The goods then will be removed from the top of the conveyor and deposited onto other suitable conveying equipment if desired.

If it was desired to employ the conveyor such that it would convey from the top to the bottom, this would be accomplished by reversing chain direction by altering the direction in which the motor(s) turns. The spiral also can have either a clockwise or counterclockwise configuration. In that case the goods would enter at the top of the conveyor and move downwardly to the end of the conveying path where they could be transferred onto a further conveying system.

Figure 14:
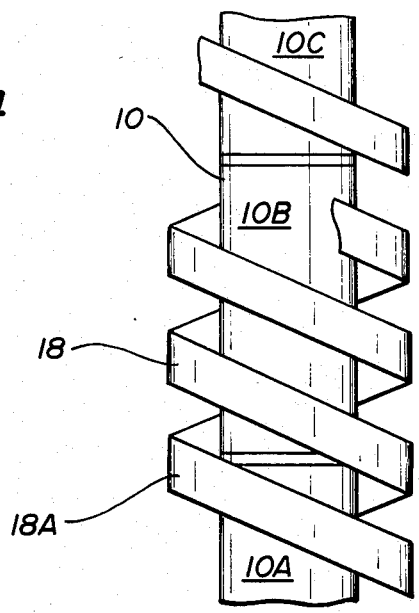
FIG. 14 is a modification to the present invention, showing multiple helixes.

FIG. 14 shows a possible variation to the present invention wherein multiple parallel helilxes 18, 18A, etc. are provided about the central core 10. While a double helix is illustrated it is possible to employ three or more helixes. The conveying paths can be in the same direction or in opposing directions and may be conventionally driven from the primary drive. Each of the helixes is constructed and arranged similar to the helix conveying path described heretofore.

It should be understood that the present invention is subject to many variations, modifications and changes in detail. However, it is intended that all matter contained in the foregoing description or shown in the accompanying drawing shall be interpreted as illustrative only and not in a limiting sense.

What is claimed is:

1. A conveyor assembly comprising a central tubular member having a longitudinal axis, track means mounted on said tubular member spaced outwardly therefrom and defining a generally helical path about said member having an infeed end and an outfeed end, said track means comprising a pair of parallel tracks for supporting endless conveyor means between said infeed and outfeed ends, said track means including a multisided polygonal construction and arrangement comprising a plurality of curved surfaces and a plurality of flat straight surfaces for reducing frictional contact with respect to said conveyor means whereby the capstan effect of said conveyor means relative to said track means is substantially overcome, an inner one of said tracks adjacent said member having an inner surface extending in the direction of said longitudinal axis facing a corresponding surface of an outer one of said tracks, said inner surface comprising a substantially multisided polygonal construction for each 360° about said central member including said plurality of flat straight surfaces which extend in the direction of said conveying path arranged in helical fashion about said frame for reducing frictional contact with said conveyor means and overcomming the capstan effect of said conveyor means relative to said inner track, said outer one of said tracks comprising a smooth continuous curved surface, drive means including a primary drive located at one of said infeed and outfeed ends, power means mounted for supplying power to said primary drive, said primary drive operably engaging said endless conveyor means for being driven at said one end in a first direction comprising a conveying path, said conveyor means having an endless return path opposite in direction and corresponding to said conveying path.

2. A conveyor assembly as claimed in claim 1 wherein said plurality of straight surfaces comprising said inner surface extend continuously along the full extent of said track means between said infeed and outfeed ends.

3. A conveyor assembly as claimed in claim 1 wherein said parallel tracks are spaced from each other and have an upper surface and an opposite bottom surface, said conveyor means includes a plurality of interconnected flight attachments each having an upper product-carrying portion overlying said upper surface and a flange portion spaced from said upper portion overlying said bottom surface, whereby said flight attachments capture said tracks.

4. A conveyor assembly as claimed in claim 3 wherein said upper surface of said parallel tracks includes channel means defined therein extending for substantially the full conveying path whereby frictional contact with said flight attachments is reduced.

5. A conveyor assembly as claimed in claim 4 including a plurality of grease injector means spaced along said track means for facilitating movement of said conveyor means relative to said track means.

6. A conveyor assembly as claimed in claim 1 wherein said primary drive and said power means are located at the outfeed end of said conveyor means.

7. A conveyor assembly as claimed in claim 1 including a secondary drive interconnected with said primary drive and located at the other of said infeed and outfeed ends.

8. A conveyor assembly as claimed in claim 7 wherein said primary and secondary drives are interconnected by chain and gear means with at least said chain means being disposed substantially within said tubular frame.

9. A conveyor assembly as claimed in claim 1 wherein said infeed and outfeed ends of said track means are constructed and arranged in tangential relation with respect to the adjacent portion of said track means.

10. A conveyor assembly as claimed as claim 1 wherein said tangential infeed and outfeed ends of said track means are disposed substantially at right angles relative to said longitudinal axis of said tubular frame.

11. A conveyor assembly as claimed in claim 1 wherein said tubular frame comprises a plurality of interconnected cylindrical members.

12. A conveyor assembly as claimed in claim 6 including gear means for reversing the direction of conveying path.

13. A conveyor assembly as claimed in claim 1 including a plurality of similar spiral paths disposed about said member.

* * * * *